United States Patent [19]

Desch

[11] Patent Number: 4,921,598

[45] Date of Patent: May 1, 1990

[54] SELECTOR VALVE, ESPECIALLY A CENTRAL CONTROL VALVE FOR A WATER TREATMENT DEVICE

[76] Inventor: Kurt M. Desch, Karl Merkenschlager Strasse 1, 8220 Traunstein, Fed. Rep. of Germany

[21] Appl. No.: 219,524

[22] Filed: Jul. 15, 1988

[30] Foreign Application Priority Data

Jul. 17, 1987 [DE] Fed. Rep. of Germany ....... 3723696
May 7, 1988 [DE] Fed. Rep. of Germany ....... 3815729

[51] Int. Cl.⁵ ............................................. B01D 35/12
[52] U.S. Cl. ..................................... 210/136; 210/141; 210/190; 210/191; 210/278; 210/340; 210/425; 137/599.1; 137/614.17; 137/625.47; 137/637.3; 251/163
[58] Field of Search ............... 210/117, 136, 141, 142, 210/190, 191, 278, 340, 425; 137/614.17, 625.47, 599.1, 637, 637.3; 251/207, 163

[56] References Cited

U.S. PATENT DOCUMENTS

| | | | |
|---|---|---|---|
| 592,501 | 10/1897 | Thompson | 137/674.17 |
| 998,672 | 7/1911 | Burleigh | 137/599.1 |
| 1,108,009 | 8/1914 | Seiss et al. | 137/614.17 |
| 1,889,231 | 11/1932 | Wahlbom et al. | 210/191 |
| 1,903,958 | 4/1933 | Clark | 210/191 |
| 1,938,628 | 12/1933 | Huppertz | 210/141 |
| 3,180,362 | 4/1965 | Muller | 251/163 |

FOREIGN PATENT DOCUMENTS 2459027 7/1975 Fed. Rep. of Germany.
3147922 11/1983 Fed. Rep. of Germany.

Primary Examiner—Richard V. Fisher
Assistant Examiner—Christopher Upton
Attorney, Agent, or Firm—Laurence R. Brown; Alfred J. Mangels

[57] ABSTRACT

A central control valve arrangement for a water treatment system. The central control valve arrangement includes two independently positionable four-way ball valves and at least one of the balls of the ball valve serving as valve body includes with two L-shaped boreholes so that a multitude of couplings between the connections of the ball valves is possible.

20 Claims, 18 Drawing Sheets

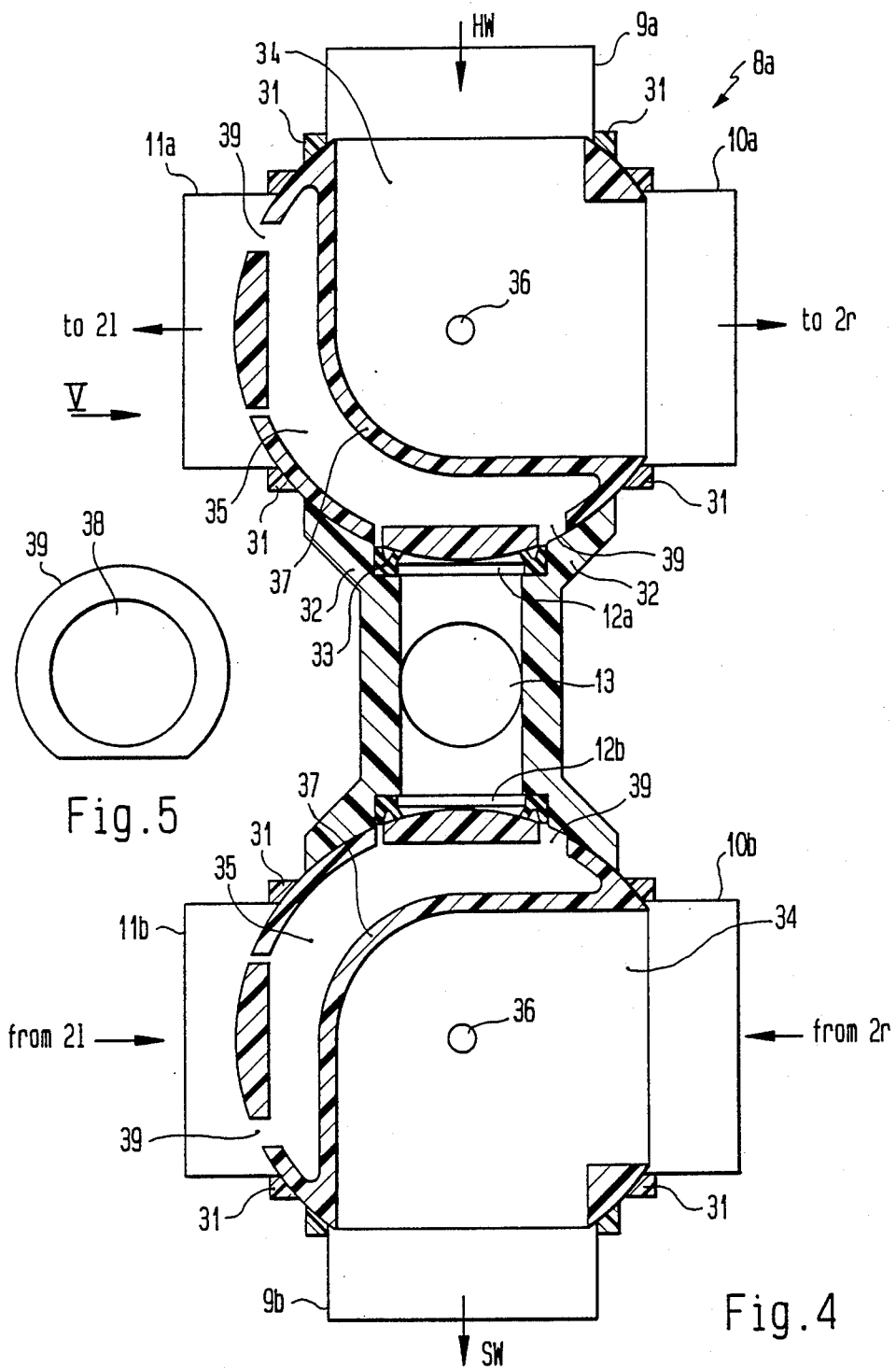

SELECTOR VALVE, ESPECIALLY A CENTRAL CONTROL VALVE FOR A WATER TREATMENT DEVICE

BACKGROUND OF THE INVENTION

1. Field of the Invention

This invention relates to a selector valve, and more particularly a central control valve for controlling the functioning of a water treatment system.

2. Description of the Related Art

Such a central control valve is known for example in German Publication No. 31 47 922. This central control valve arrangement comprises an operational valve and a channel valve, and can be set in several different positions by positioning these two valves. These positions allow: (1) removal of soft water from a water container which is fitted with a filter, (2) the introduction of regenerating means into the water container once the filter is used up in order to regenerate the filter and to drain hard water into a drain channel, and (3) rinsing of the water container after regenerating and discharging the rinse water into the drain channel.

SUMMARY OF THE INVENTION

The purpose of the invention is to provide a central control valve arrangement which is easily manufactured with small dimensions and which is easily controllable. With slight modification the central control valve arrangement functions as a control mechanism for a water treatment apparatus having two water containers.

The invention suggests a central control valve arrangement containing two selector ball valves, coupled together hydraulically and mechanically. At least one of the two balls comprises two L-shaped boreholes. If both balls comprise two L-shaped boreholes, then a water treatment apparatus having two water containers can be connected to the central control valve arrangement. The ball valves are operable independently of each other. Preferably only one apparatus, for example a small electric motor, is used to position the balls, whereby depending on the turning direction, only one of the two balls moves. In order to prevent movement of one ball while the other is being positioned, clutchwheels are placed between the drive shafts of the balls and the positioning motor; these clutchwheels operate in counter turning directions.

The two ball valves can be additionally coupled together by means of a circulating flow channel or by means of an outside flow channel. Each ball valve would thus have, for example, four connections, whereby three connections would have the same normal cross section and the fourth would have a smaller cross section. The connections with the smaller cross section are linked together and thus hydraulically couple the two ball valves. The coupling channel has a connection for a discharge conduit. All connections of both ball valves are arranged in a 90° angular relationship to each other.

The first L-shaped borehole within each ball (the main borehole) has a cross section roughly corresponding to a greater normal cross section of the three connections. The bore axis of this main borehole lies in a plane vertical to the rotation axis of the ball and takes a course from the circumference of the ball to the rotation axis and forming there a right angle back to the circumference of the ball. The bore axis of the second L-shaped borehole (the secondary borehole), lies in the same plane roughly coaxially to the bore axis of the main borehole and is oriented in the direction of the circumference of the ball. The outer wall of this secondary borehole has two watertight plates at an angular displacement of 90°, for closing the coupling borehole between the two ball valves with a smaller cross section. If the watertight plate is within the range of a coupling borehole with the greater normal cross section, then an aperture results, through which fluid from this connection can enter into the secondary borehole. The watertight plate of this secondary borehole (in the ball) can be, for example, spring biased in order to positively close off the (smaller) connection borehole. Another possibility is to operate the watertight plates by means of a gatetype control mechanism which is operative during the turning of the balls. In this way a coupling of a connection of the central control valve with the secondary borehole as well as with the channel connection can be established, since the gatetype control mechanism or cam control makes it possible to prevent the ductile watertight plate selectively from striking the small cross section, generally that of the channel connection, while holding the watertight plate tight. In this way, a coupling of the two connections with greater normal cross section can be established with the main ball borehole at an open channel connection. Thus, each of the two balls constitutes a channelling valve with a double L-shaped borehole.

Connection arrangements of the central control valve other than those mentioned are, of course, possible and are a function of the design of the balls with one or two boreholes and their rotation axis as well as of the connection of the central control valve with one or two water containers.

Further arrangements of the invention relate to the subclaims hereinafter.

BRIEF DESCRIPTION OF THE DRAWINGS

Embodiments of the invention are further illustrated by means of the drawing, wherein:

FIG. 4 shows a section through the central control valve along IV—IV in FIG. 2;

FIG. 5 shows a side view in direction V of the ball serving as valve body of a ball valve;

DESCRIPTION OF THE PREFERRED EMBODIMENTS

Figure 1:
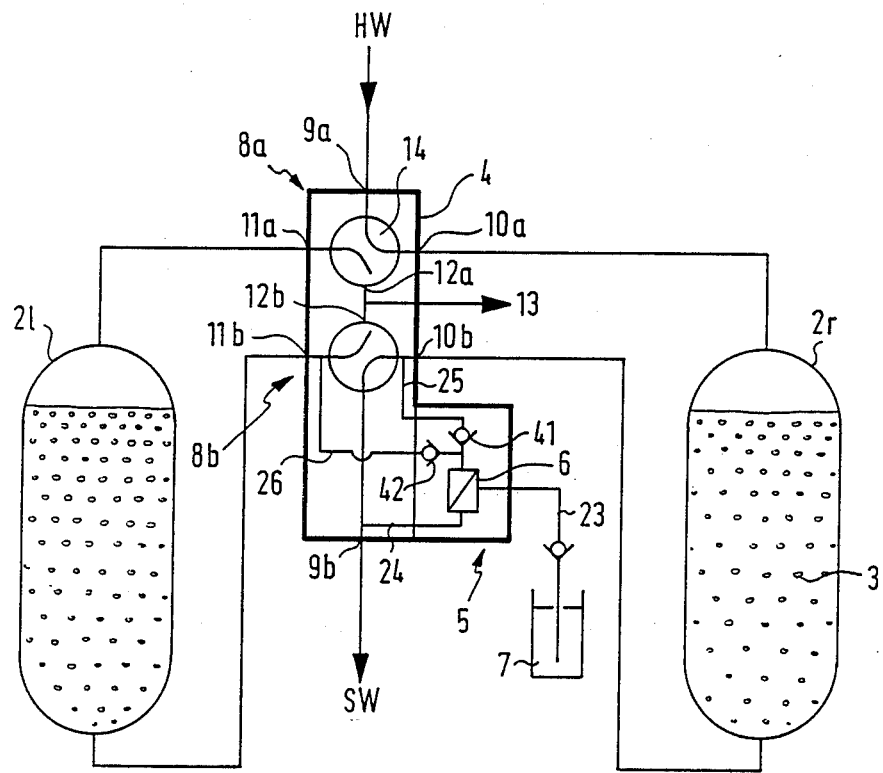
FIG. 1 shows a schematic diagram of a water treatment apparatus with two water containers and a central control valve according to the invention with two ball valves independently controllable.

In FIG. 1 a water treatment system 1 is shown, which has: two water containers 2r, 21 containing filter material 3; a central control valve arrangement 4 and a regenerating apparatus 5 out of an injector 6; and a regenerating means container 7.

The central control valve arrangement 4 is made up of two ball valves 8a and 8b. The ball valve 8a has a hard water connection 9a, two container connections 10a and 11a and a channel connection 12a. The ball valve 8b has a soft water connection 9b, two container connections 10b and 11b and a channel connection 12b. The channel connections 12a and 12b are coupled together and lead to a common channel 13. A ball 14 serves in both cases as a valve body.

Figure 2:
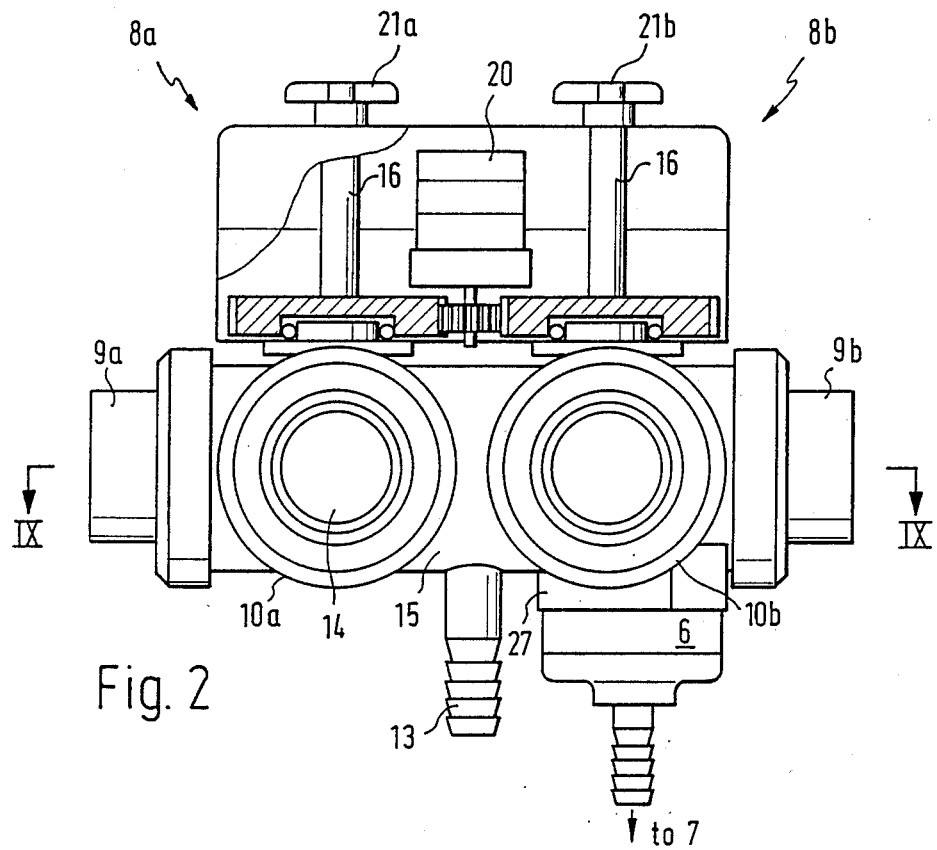
FIG. 2 shows partially in cross section a side view of a central control valve.
Figure 3:
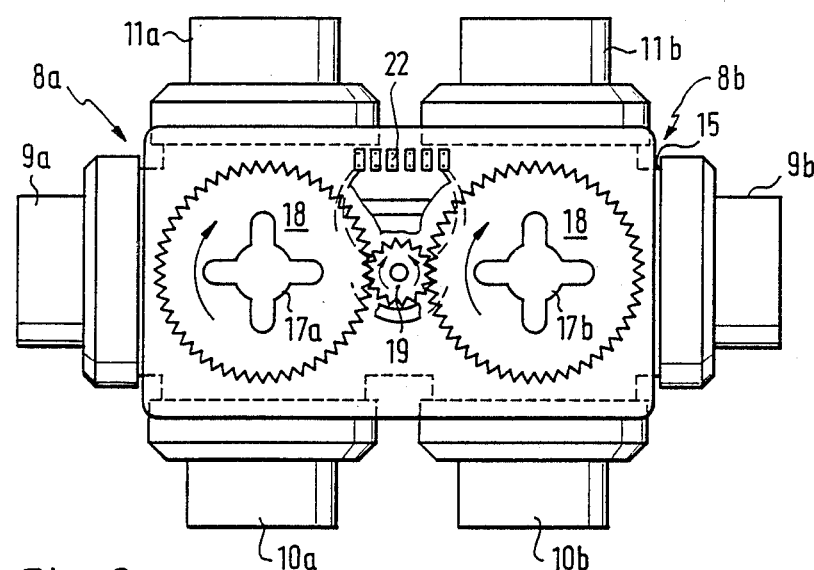
FIG. 3 shows a partly open top view of the central control valve according to FIG. 2.

As shown in FIGS. 2 and 3, the two ball valves are preferably integrated in a common housing 15; this, however, is not necessary. Each ball 14 is equipped with a shaft 16 with which, by turning, the ball can be moved into the various valve positions. The shaft 16 of the ball valve 8a is connected with a toothwheel 18 by means of a clutchwheel 17a. The shaft of the ball valve 8b is connected with a toothwheel 18 by means of a clutchwheel 17b. The teeth of both toothwheels 18 mate with a driving toothwheel 19, which is driven by a drive motor, for example, a small electric motor 20. The electric motor 20 can turn in both directions, which is illustrated with the arrows in the driving toothwheel 19. The clutchwheels 17a and 17b are thus so constructed that with one turning direction of the driving toothwheel only the shaft 16 of one ball valve is driven while the shaft of the other ball valve, due to its adjoining clutchwheel, does not turn. In this way, each of the two ball valves 8a and 8b can be independently positioned. For example, in order to allow a starting position of the two ball valves 8a and 8b, both shafts 16 are additionally equipped with a handwheel 21a, 21b. The drive motor may be controlled by a program which can be found on a display chart 22 of the housing cover. By means of this display chart, separated operations can, of course, be chosen. Also evident from FIG. 2 is the injector 6 of the regenerating apparatus 5, arranged over an injector connection block 27 on housing 15 and having a suction connection 23 which leads to the regenerating means container 7. The injector is connected at the entry side with the soft water connection 9b by means of channel 24 within the housing. The exit of the injector 6 is coupled with the container connections 10b or 11b either within the housing or in the injector connection block 27, which is situated on the valve housing, by means of two channels 25 and 26 for which check valves 41 and 42 are provided.

In FIG. 4, the inner construction of the central control valve is shown. Each connection 9a, 9b, 10a, 10b, 11a and 11b has the same cross section, while the channel connection 12a and 12b has a smaller cross section. Within the housing each ball 14 is sealed in the vicinity of the three connections with the greater cross sections, for example, with teflon sealing material 31, disposed on the housing. In the vicinity of the channel connections a double sealing structure is shown, which consists of ball sealing structure 32 and a self-supporting lip sealing structure 33 concentrically inlaid within the ball sealing structure 32 to surround the channel connection. Each ball 14 has two L-shaped boreholes, namely a main borehole 34 and a secondary borehole 35, whose bore axes, lying in the course of the L, lie in a plane vertical to the turn axis 36 of the ball. The main borehole 34 has a cross section on its intake openings on the ball circumference and over its length, which corresponds to the cross section of each of the three connections 9a, 9b, 10a, 10b, 11a and 11b. The main borehole 34 is separated from the secondary borehole 35 by a wall 37, so that the secondary borehole 35 lies between this wall 37 and the circumference of the ball. The secondary borehole 35 has two intake openings 39, which are staggered at 90° and are narrowed by means of a sealing body, in this case a watertight plate 38, whereby the circular ring on the ball circumference surrounding the watertight plate 38 is designed so that a sickle-shaped intake opening results, as shown in FIG. 5. The watertight plate 38 is arranged such that with it either of the channel connections 12a or 12b can be closed, and that when the watertight plate 38 lies near the three other connections, a coupling results between these connections and the inner space of the secondary borehole 35 by means of the sickle-shaped intake opening 39. In FIG. 4, each of the two channel connections 12a and 12b is closed by means of the watertight plate 38, whereby the sealing effect is supported by the lip sealing structure 33, lying on the circumference of the watertight plate. In this position of the central control valve arrangement, the connections 11a and 11b couple with the inner space of the secondary borehole by means of the sickle-shaped intake openings 39.

The function of the central control valve arrangement 4 in a water treatment system 1 is explained below using FIGS. 4, 6, 7, 8 and 9.

In the operating position of the central control valve arrangement 4 according to FIG. 4, hard water HW flows in the hard water connection 9a and is led over the main borehole 34 through the container connection 10a to the intake opening of the right water container 2r. The hard water is softened in this container, so that soft water WW flows out of the lower connection of the right water container 2r. The soft water is led over the connection 10b and the main borehole 34 of the second ball valve 8b into the soft water connection 9b. There soft water WW can be removed.

In the left water container 21, connected to the container connections 11a and 11b, water, already made soft by a previous softening process, is present. This soft water is also in the secondary boreholes 35 of the balls 14, but cannot flow into the channel 13 since the channel closings 12a and 12b are closed by the watertight plate 38 of the ball.

Figure 6:
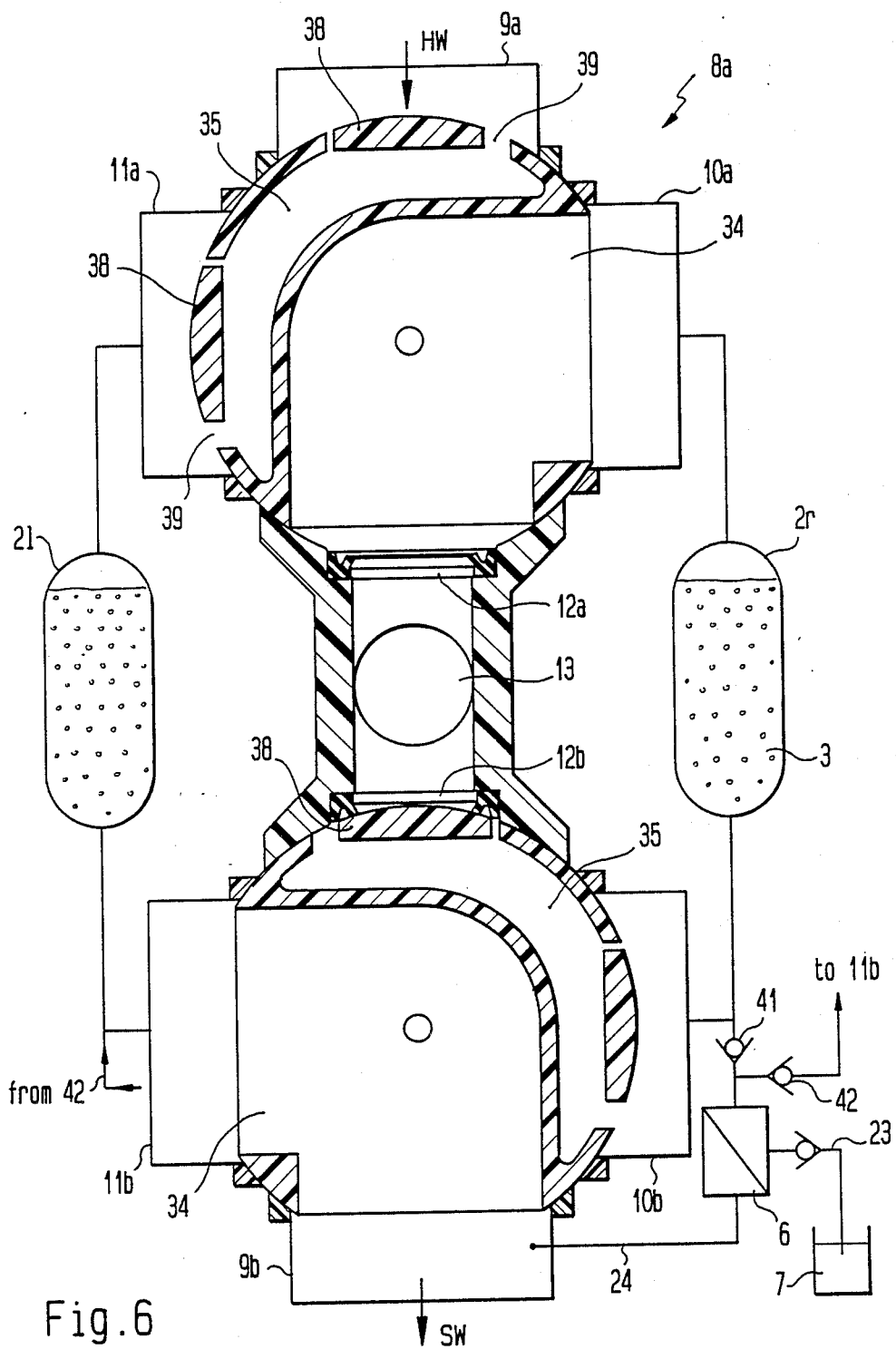
FIGS. 6, 7, 8 and 9 show further positions of the central control valve for soft water withdrawal, for salting or regenerating and for rinsing the water container.

When the filter material 3 in the right water container 2r is used up, a next step regenerates this filter material, allowing simultaneously soft water to be removed from the left water container 21. The valve position needed for this function is shown in FIG. 6. This valve position can be established when both balls of the ball valves 8a and 8b are turned clockwise 90°. Upon turning on the electric motor 20, the driving toothwheel 19 of FIG. 3 is driven, to begin with, in a counterclockwise direction, whereby the toothwheel 18 of the ball valve 8a is turned into the new position by means of the clutchwheel. During this process the toothwheel 18 of the second ball valve 8b remains in its starting position. Finally, the rotation direction of the motor is changed, whereupon the toothwheel 18 of the secondary ball valve 8b is driven and thus by means of the shaft 16 the ball of this valve is turned. During this adjustment the ball of the ball value 8a remains in the position it ended up in. In this position the removal of water from the right water container 2r is interrupted by means of the connection 9b. However, soft water can continue to be removed from the left water container 21, since by means of the main borehole 34 of the ball of the second ball valve 8b the soft water connection 9b is coupled with the container connection 11b. During the removal of soft water from the left water container 21, this container can be filled with hard water HW, which flows through the hard water connection 9a of the first ball valve 8a by means of the sickle-shaped intake opening 39, the side chamber 35, the further sickle-shaped intake opening 39 and the container connection 11a into the water container 21. The amount of hard water flowing into the left water container 21 is with this valve position of course not as high as the valve position shown in FIG. 4, since here the entire cross section of the main borehole 34 is made available for the hard water flow. However, this reduced hard water supply is, in any case, enough for limited operation and can be enlarged as shown below in connection with FIGS. 10 to 13.

The soft water connection 9b of the second ball valve 8b is coupled with the injector 6 by means of channel 24 within the housing. The water flowing through the injector exerts a suction pressure on the regenerating means in the regenerating means container 7, so that the regenerating means, normally a salt, is primed by means of the suction connection 23 and is led over the check valve 41 and the channel 25 to the container connection 10b and thus to the lower connection of the right water container 2r. Upon regenerating the right water container 2r, the check valve 42 is held shut by means of the water pressure in the other water container 21, regardless whether soft water is removed or not. The regenerating means mixed with water is pressed through the right water container 2r, whereby the water coming out of the higher connection of the right water container 2r is led into channel 13 by means of the container connection 10a, the main borehole 34 of the ball of the first ball valve 8a and the channel connection 12a. The regenerating means entering the right water container 2r also fills the secondary borehole 35 of ball 14 of the second ball valve 8b; however, from here it cannot flow off since the channel container 12b is closed by means of the watertight plate 38.

Figure 7:
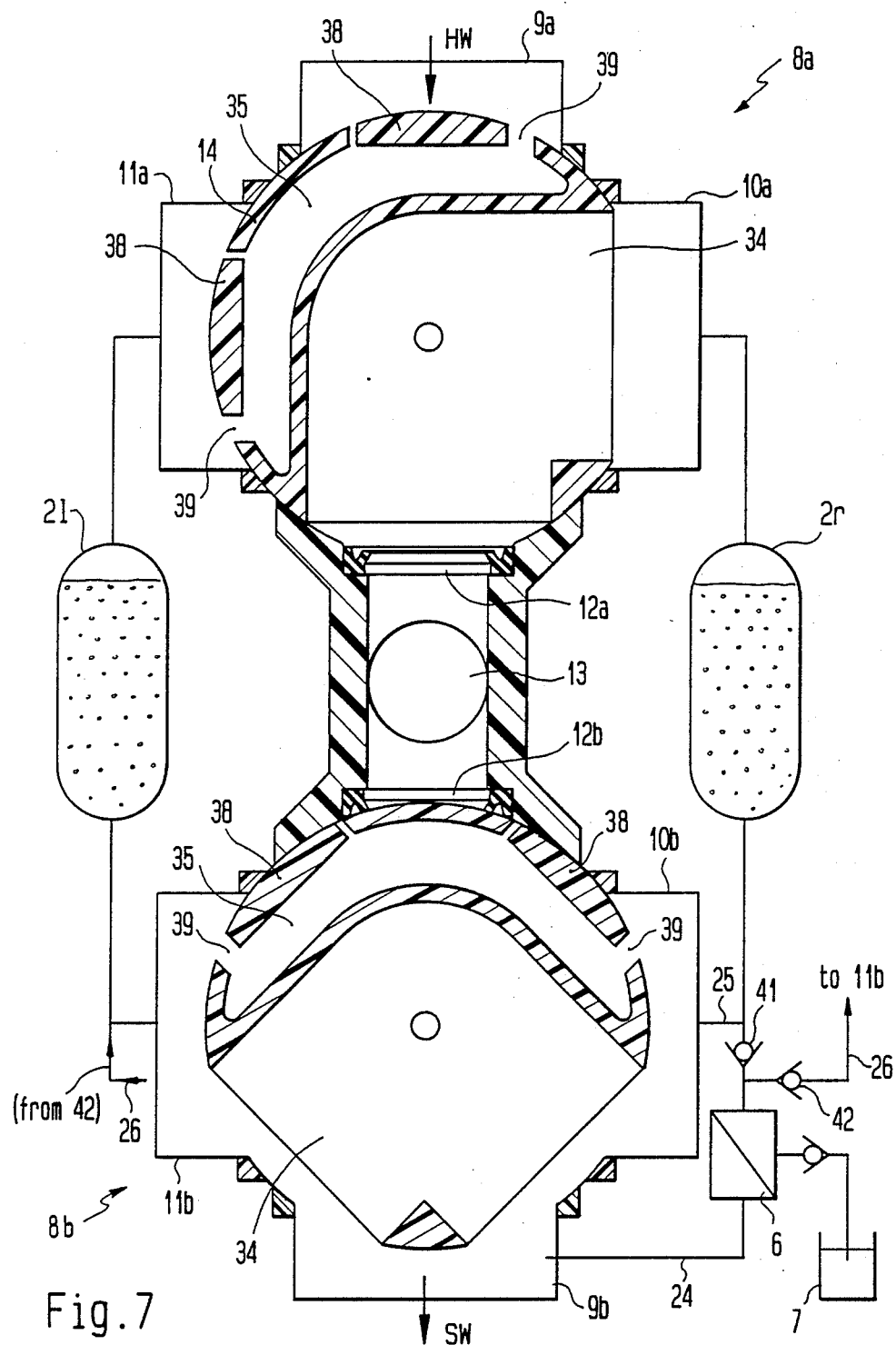

As soon as the right water container 2r is filled with regenerating means, soft water rinses the water container. The valve position necessary for this operation is shown in FIG. 7. The ball valve 8a remains in the same valve position as in the previous salting step, while the ball 14 of the second ball valve 8b is turned 315° clockwise by means of the electric motor 20. As can be seen in FIG. 7, a current connection now exists between the container connection 11b and the opposite container connection 10b, by means of the main borehole 34 as well as by means of the secondary borehole 35 of ball 14. At the same time, the soft water connection 9b is opened. Thus, soft water from the left water container 21 can be removed by means of the soft water connection 9b and soft water from the left water container 21 is pressed into the right water container 2r by means of the lower connection of the right water container 2r. In this way, the regenerating means as wash water for the removal of the hard water residue from this right water container 2r is led off by means of the connection 10a and the channel connection 12a of the first ball valve 8a in the channel 13. As soon as the right water container 2r is completely washed out with soft water, the cycle of regenerating the right water container is finished, as long as a short wash cycle of the water container from top to bottom is dispensed with. By means of the sickle-shaped formation of the intake and exit openings 39 of the secondary borehole 35, as shown in FIG. 5, it is possible to hold the channel connection 12b closed when the ball 14 is in a 45° intermediate position.

Figure 8:
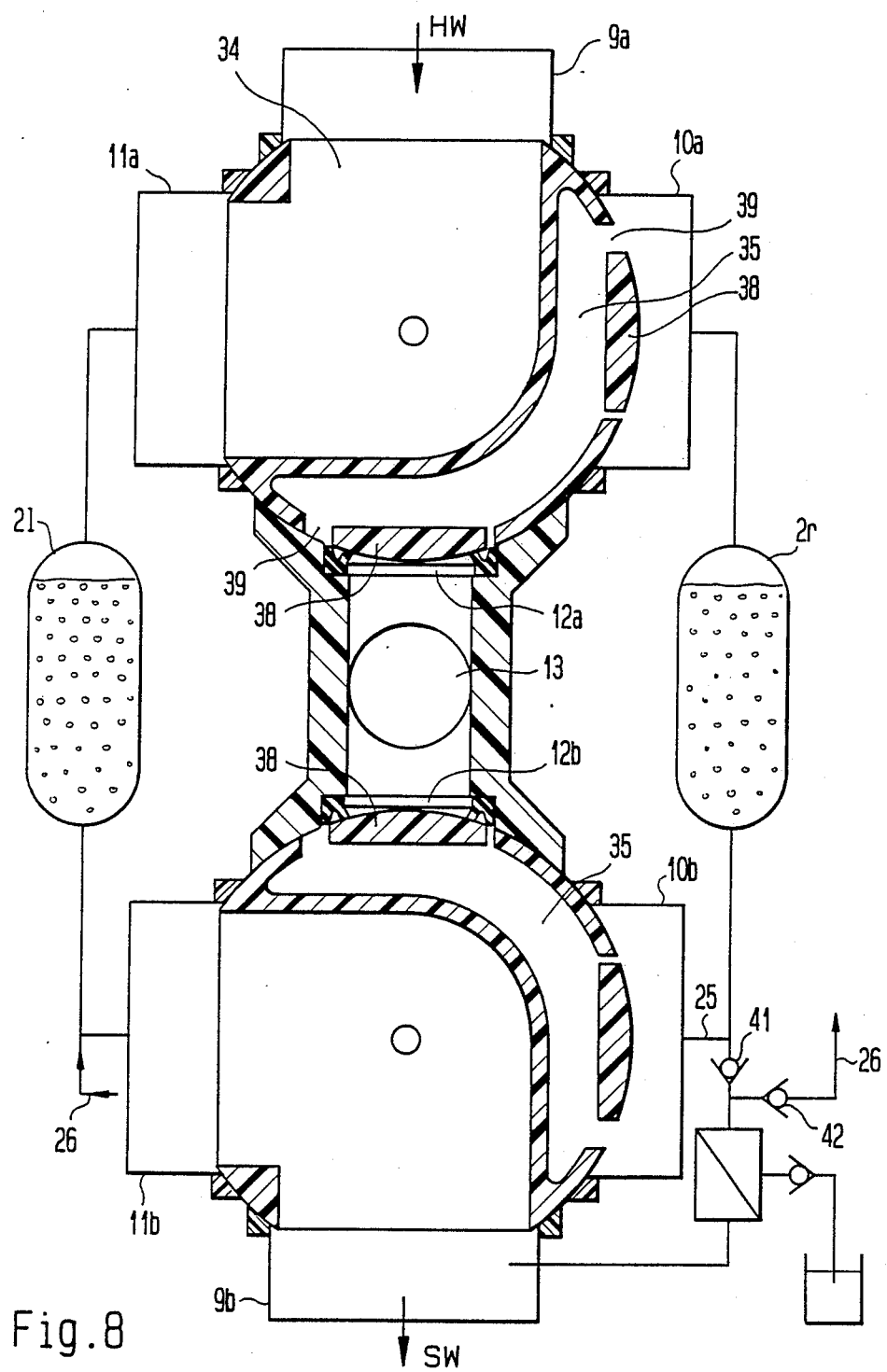

Finally the central control valve arrangement is positioned, according to FIG. 8, whereby the right water container is closed and soft water can again be removed from the left water container 21. For this the ball 14 of the first ball valve 8a is turned clockwise 180° so that the hard water connection 9a communicates with the container connection 11a. The ball 14 of the second ball valve 8b is turned clockwise 45° so that by means of the main borehole the container connection 11b communicates with the soft water connection 9b. The upper connection of the right water container 2r communicates with the secondary borehole 35 by means of the sickle-shaped intake opening 39 on the container connection 10a. However, the secondary borehole 35 is closed opposite the channel connection 12a by means of the watertight plate 38. In the same way, the lower connection of the right water container 2r communicates with the secondary borehole 35 of ball 14 of the second ball valve 8b by means of the container connection 10b, whereby likewise the channel connection 12b is closed by means of the watertight plate 38.

As soon as the filter material 3 of the left water container 21 is used up, the filter material of the left water container 21 is salted corresponding to the step shown in FIG. 6 and then this water container is back-rinsed in a further step corresponding to FIG. 7. The valve positions for these steps follow automatically from the above description.

Figure 9:
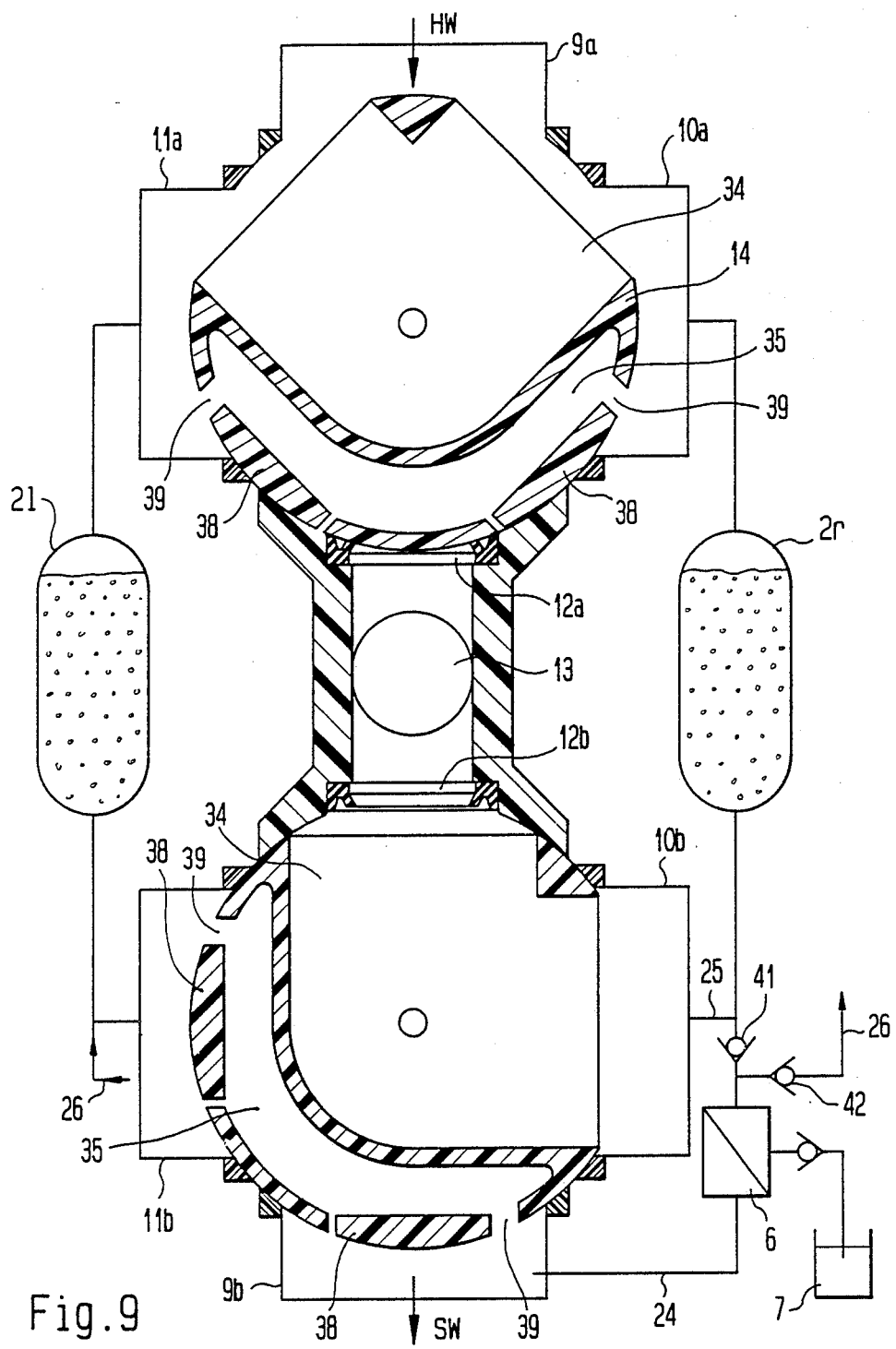

With some water treatment systems provision for a short wash cycle is desirable, for which in this case the channel connection 12b of the second ball valve must also be opened. The valve position necessary for this operation is shown in FIG. 9. The ball 14 of the ball valve 8a is positioned according to the position taken by ball valve 8b in FIG. 7. In this way the container connections 10a and 11a are coupled with the hard water connection 9a, whereby the channel connection 12a is closed by means of the ball. The coupling of the two container connections 10a and 11a follows by means of the main borehole 34 as well as the secondary borehole 35. The ball of the second ball valve 8b is located such that the container connection 10b communicates with the channel connection 12b by means of the main borehole 34 of the ball. The container connection 11b and the soft water connection 9b are in contact with each other by means of the secondary borehole 35. The entry of hard water in the hard water connection 9a now allows water to also be pressed in the channel 13 by means of the channel connection 12b. Due to a corresponding mirror symmetry this short wash cycle is also possible for the left water container 21.

Figure 10:
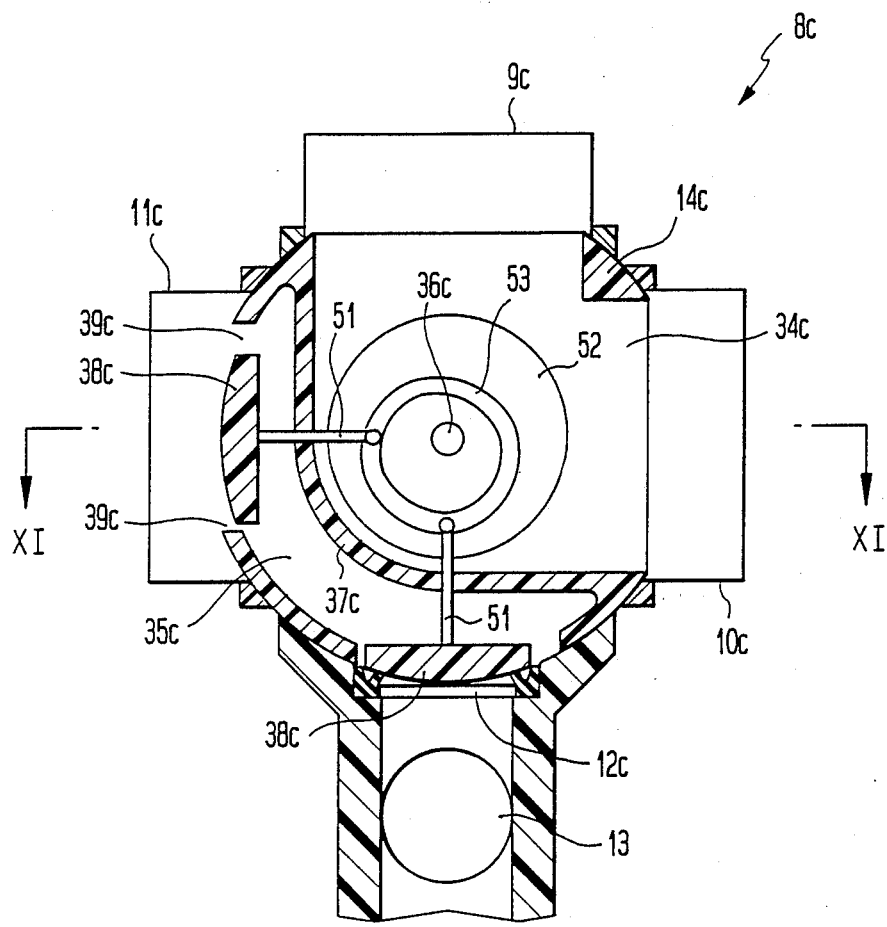
FIG. 10 shows a cross section through a ball valve of a central control valve arrangement in a version modified with respect to FIG. 4.

In FIG. 10 a modified embodiment of one of the two ball valves is shown, designated here with 8c. The connections 9c to 12c correspond to those of the above described version. Likewise, the ball 14c, consisting of a main borehole 34c and a secondary borehole 35c, is designed corresponding to the above embodiment. Differences exist with regard to watertight plates 38c, which are no longer coupled to the ball 14 in a solid or spring-biased manner, but are adjustably bedded. For this each of the sides of the watertight plate 38c which are inside the ball is coupled with a tie rod 51. These tie rods project through the separating wall 37c between the main and secondary borehole and are led along a cam 53 with their ends in guiding groove means 52. This cam proceeds asymmetrically around the turn axle 36c of the ball valve thus allowing the channel connection 12c or 12b to be opened.

Figure 11:
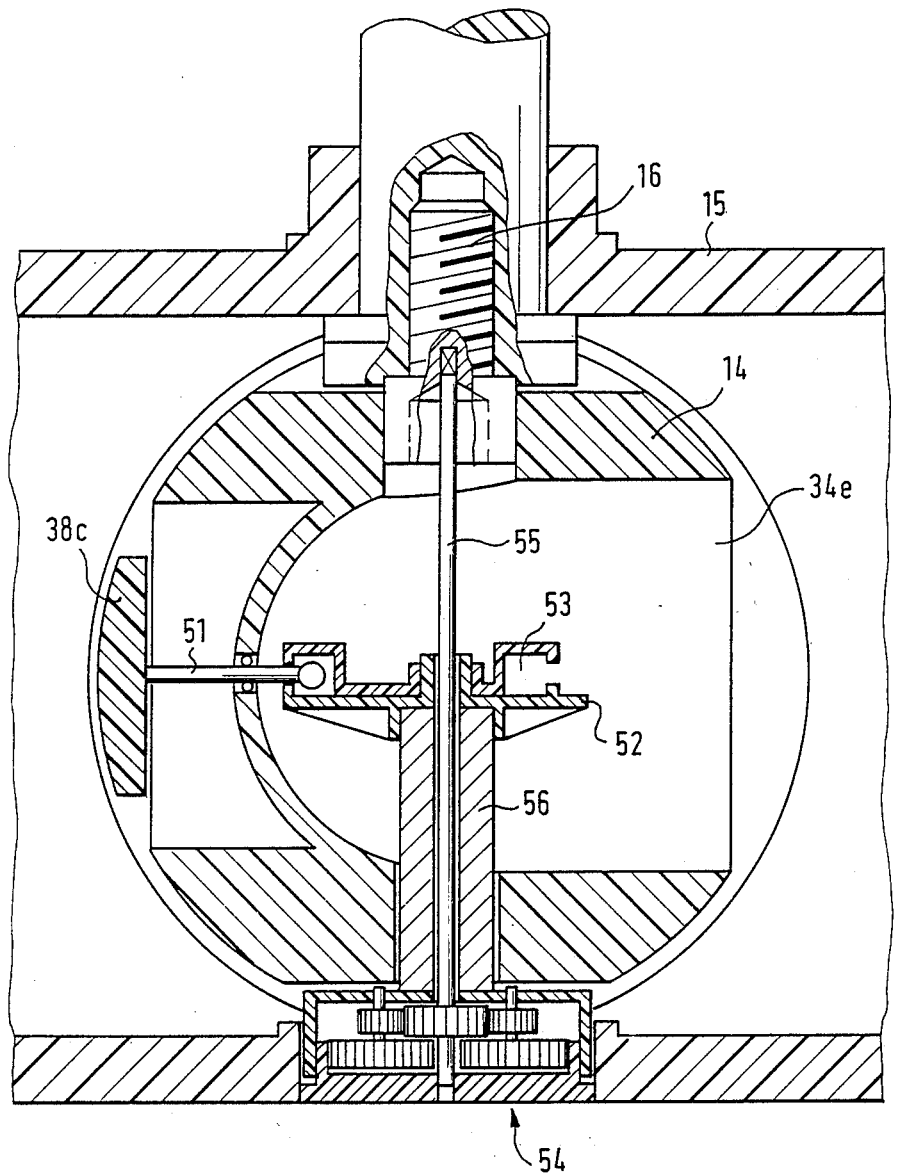
FIG. 11 shows a cross section through the ball of a ball valve with a planetary gear driven by the ball for controlling the watertight plate of the ball.
Figure 12:
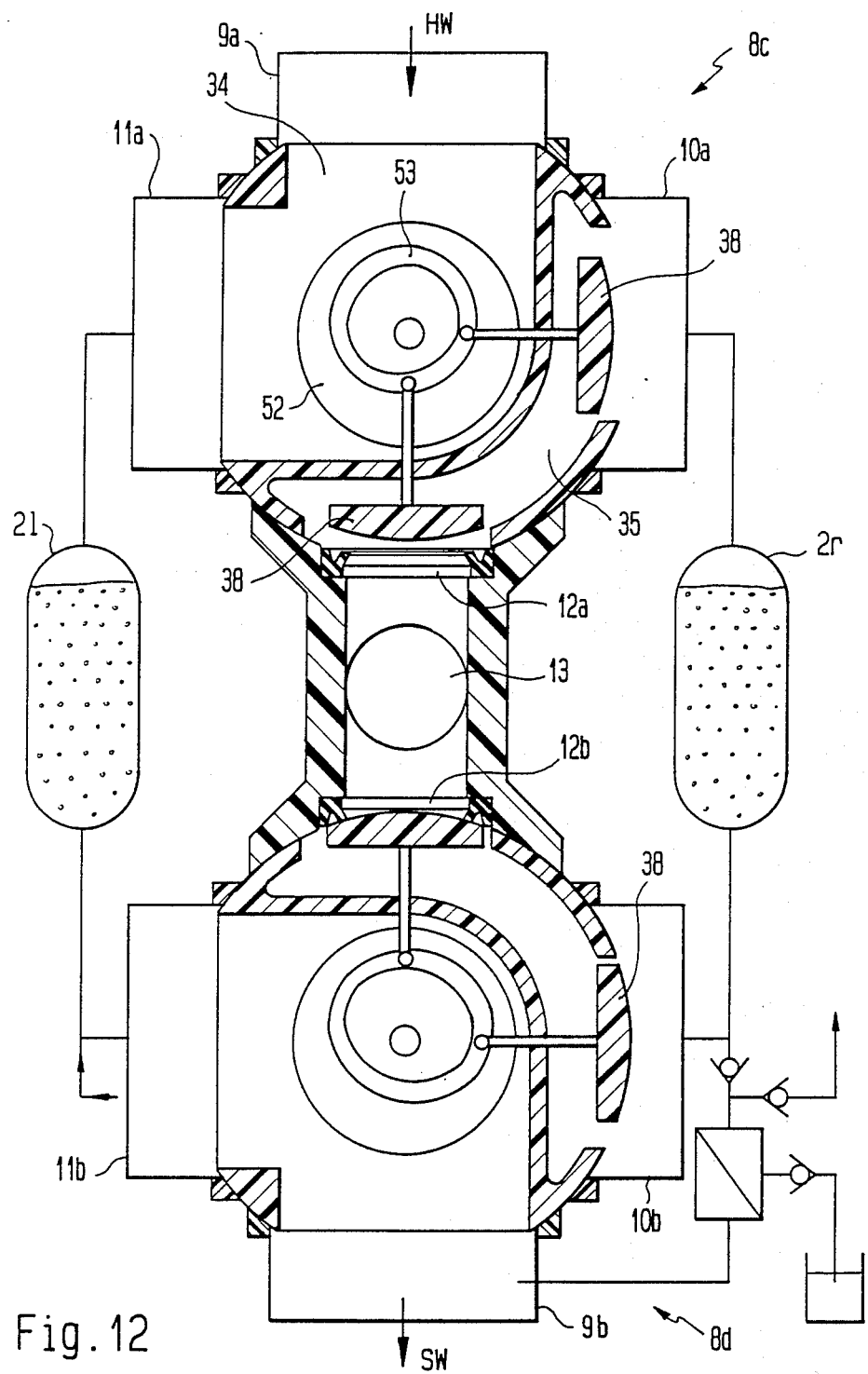
FIG. 12 shows a schematic representation of a central control valve with two ball valves outfitted with a planetary gear, the valves being in a first valve position.
Figure 13:
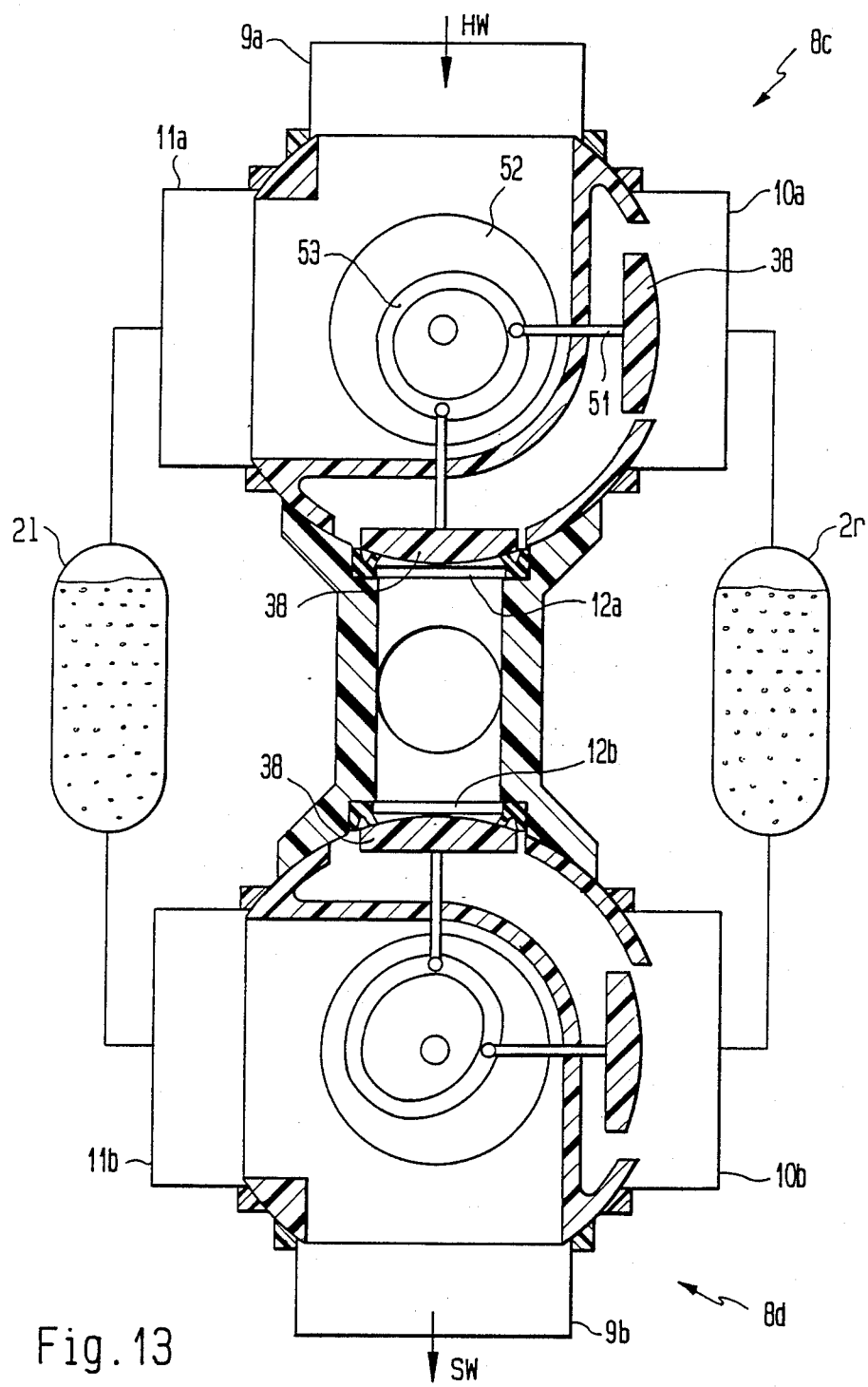
FIG. 13 shows the central control valve of FIG. 12 in a second valve position.

This cam can be driven directly by means of the ball 14 with the help of a planetary gear 54, as shown in FIG. 11. The shaft 16, used to position the ball 14, is lengthened with a thin rod 55, led through the ball, for driving the planetary gears. The guiding groove means 52 carries a hollow shaft 56, which is braced on the planetary wheel carrier. The gear unit is arranged here outside of ball 14; however, an arrangement in the main borehole 34 directly underneath the guiding groove means is also possible. By setting the gear ratio of the planetary gear at 2:1, for example, two different positionings of the watertight plate 38c can be established with the same ball positionings (which differ only by a 360° turn). The result of this is a multitude of variations to release connections or to seal them off partly or fully. FIGS. 12 and 13 show examples.

In FIG. 12 is shown the valve position of both ball valves 8c and 8d which is assumed during the regeneration of the right water container 2r. As far as the function is concerned, this FIG. 12 corresponds to the above FIG. 6. By means of the control of the valve plate 38 with help from the cam 53 and the planetary gear shown in FIG. 11, it is possible to supply hard water HW to the left water container by means of the hard water connection 9a and the main borehole 34 of the ball valve during the regeneration of the filter material of the right water container 2r. It is likewise possible to remove soft water from the connection 9b by means of the main borehole as well. Contrary to the embodiment of FIG. 6, the hard water inflow, which in FIG. 6 results by means of the secondary borehole 35, is hereby unlimited. During the regeneration of the filter material of the right water container 2r, the water mixed with the regenerating means is pressed through the secondary borehole 35 of the higher ball 14 in the channel 13 by means of the channel connection 12a. The intake cross section in the secondary borehole 35 of the ball 14 is hereby enlarged, since the watertight plate 38 can be pulled back out of its peripheral location as far as the construction of the cam 53 allows. The same effect can be accomplished with a freely striking watertight plate, which then cannot, however, be obstructed from striking. The watertight plate 38 on channel connection 12a is here in any case pulled back over the cam, so that the channel connection 12a is released. In FIG. 13, the valve position upon the end of the regeneration process is shown. The balls of both ball valves 8c and 8d are located in the same turn position as in FIG. 12, whereby, however, a 360° rotation of each ball between the valve positions exists, contrary to FIG. 12. In this way, the channel connection 12a is closed by means of the watertight plate 38. The soft water located in the right water container 2r can thus no longer flow off by means of the channel. Soft water is further removed from the left water container 21 until its filter material is used up. Finally, soft water is removed from the right water container 2r, whereby the filter material of the left water container is simultaneously regenerated.

Figure 14A:
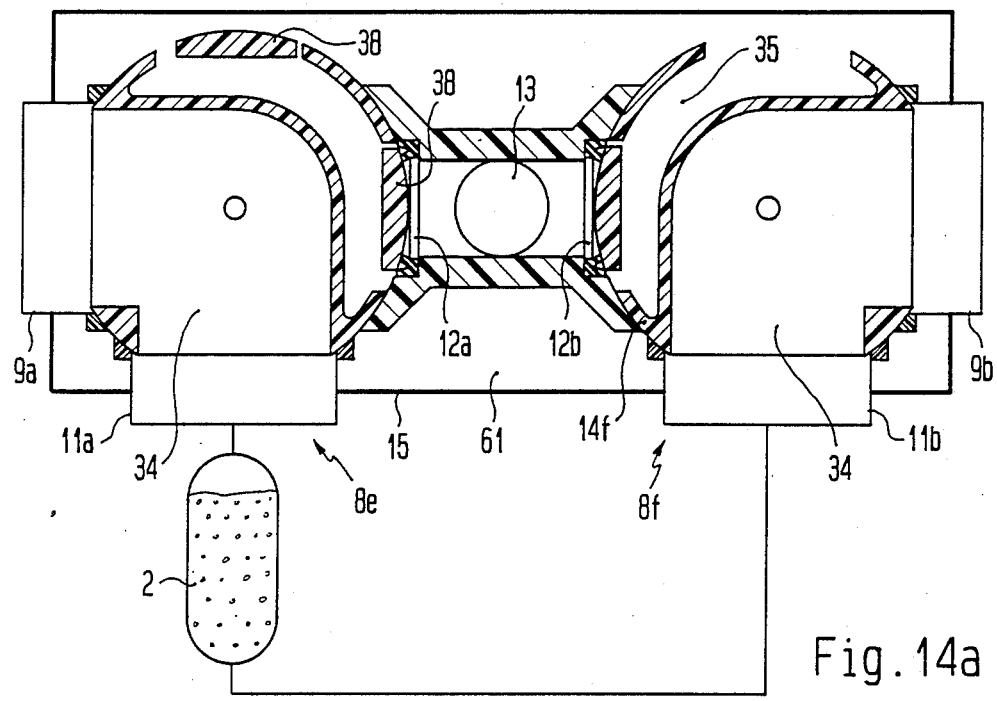
FIGS. 14a and 14b show cross sections through a central control valve of a water treatment system with a water container in various valve positions.
Figure 14B:
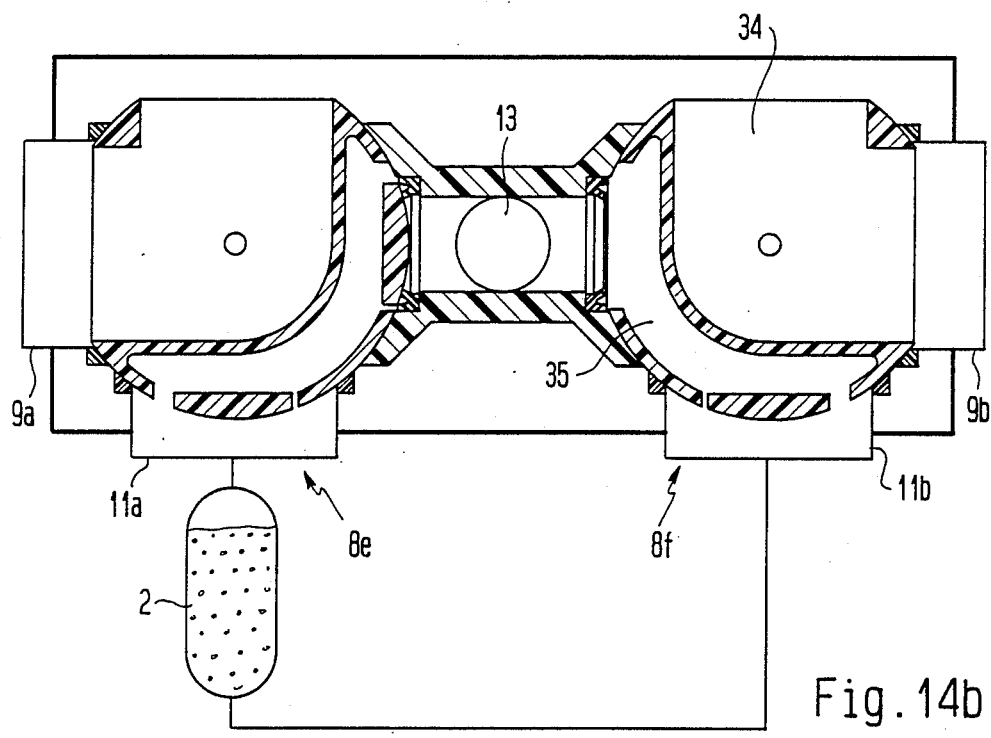

In FIGS. 14a and 14b a central control valve arrangement 4 with two ball valves 8e and 8f is shown; this central control valve arrangement is merely connected to a water container 2. Each ball 14 and 14f consists of a main borehole 34, a secondary borehole 35 and, in this secondary borehole, a watertight plate 38, whereby the ball 14f of the valve 8f has a watertight plate 38 only in an intake or discharge opening of the secondary borehole 35. According to FIG. 14a, hard water is supplied to the hard water connection 9a and by means of the main borehole 34 and a container connection 11a is supplied to the upper intake opening of the water container 2. With the soft water removal procedure, soft water flows out of the water container 2 and out of the soft water connection 9b by means of the container connection 11b of the second ball valve 8f through its main borehole 34. The valve housing 15 surrounds both ball valves 8e and 8f, whereby this housing itself is designed in the area between the two balls as circulating flow channel 61, which surrounds the pipe, which is coupled by the two channel connections 12a and 12b. If the filter material in the water container is used up, then the container can be regenerated by salting, whereby with the help of an injector (not pictured) in the upper connection of the container a regenerating means is introduced. The water/regenerating means mixture passes into channel 13 by means of the lower connection of the water container, the container connection 11b and the secondary borehole 35 of the ball of the second ball valve 8f. Channel 13 is open since no watertight plate on this discharge opening of the secondary borehole is present. During this time hard water can be removed at connection 9b. This hard water passes into the circulating flow channel 61 by means of the hard water connection 9a and the main borehole of the ball of the first ball valve 8e and then flows through the main borehole 34 of the second ball valve 8f out of the connection 9b.

Figure 15A:
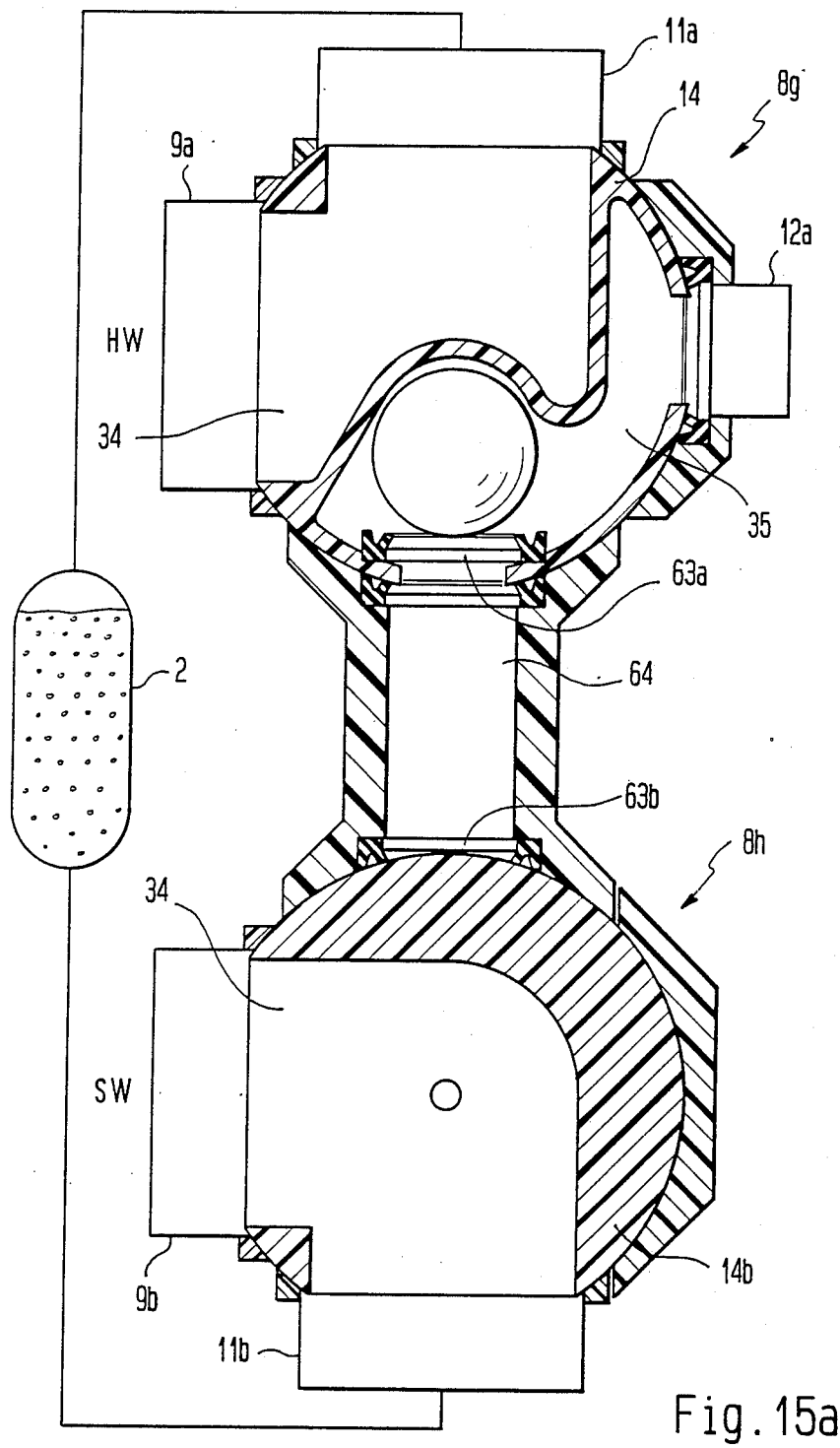
FIGS. 15a, 15b and 15c show cross sections through a further version of a central control valve for a water treatment system with a water container in various valve positions.
Figure 15B:
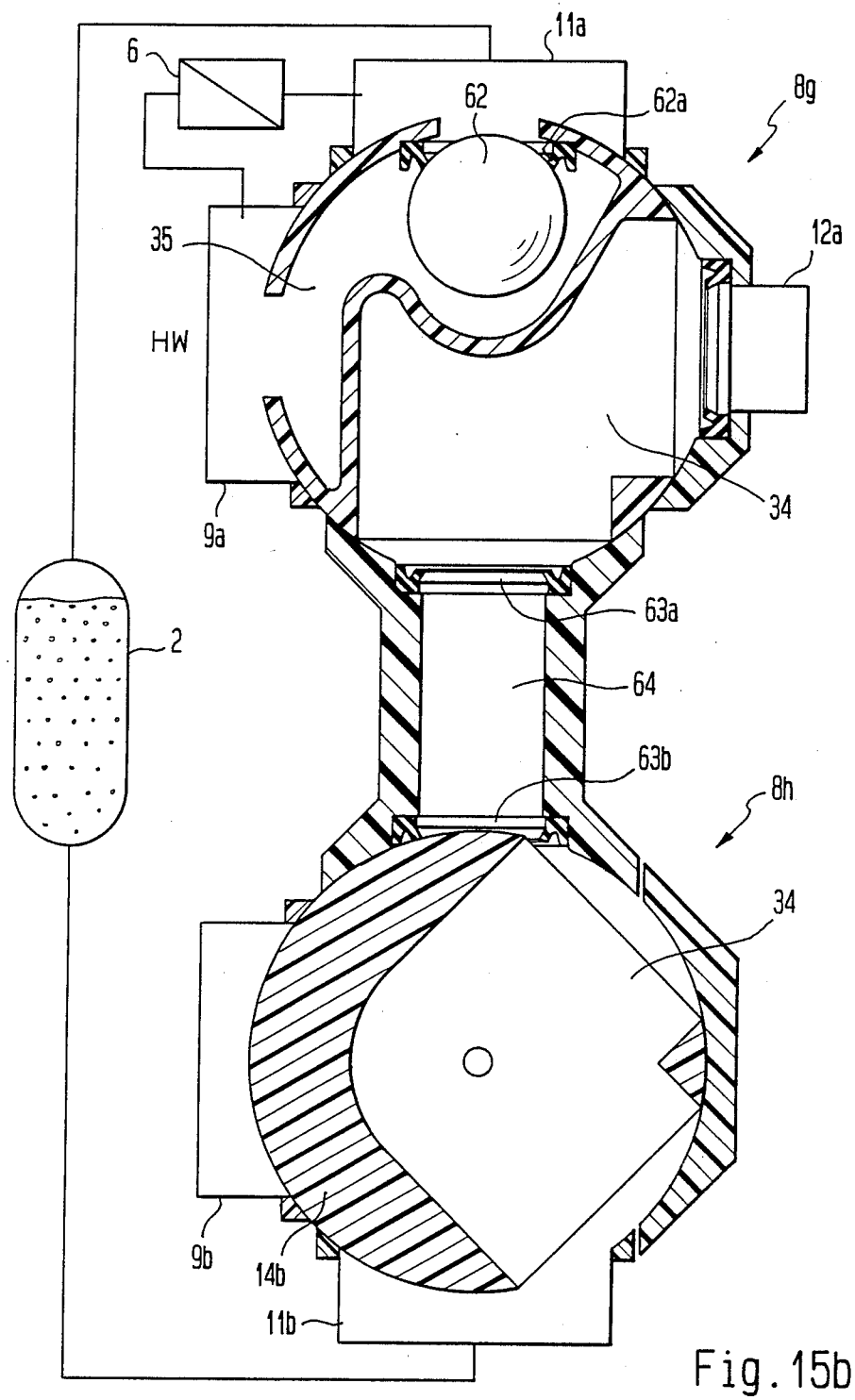

In FIGS. 15a and 15b a central control valve arrangement 4 of a watertight system is shown with only one water container 2. the central control valve arrangement has two ball valves 8g and 8h, whereby the ball 14 of the ball valve 8g has a main borehole 34 and a secondary borehole 35, while the ball 14 of ball valve 8h shows only a main borehole 34. A valve ball 62 is arranged in a freely moving manner in the secondary borehole 35 in ball valve 8g. This valve ball allows the flow-through of this secondary borehole in only one direction. Instead of a valve ball a shutter could also be used. In the operating position of FIG. 15a, hard water HW flows into the hard water connection 9a of ball valve 8g and through the main borehole 34 and the container connection 11a to the upper end of the water container 2. The lower end of the water container 2 is coupled with the container connection 11b of the second ball valve 8h and flows through the main borehole 34 to the soft water outlet 9b. A channel connection 12a, which leads to a channel not shown here, lies across from the connection 9a. The two ball valves 8g and 8h have coupling connections 63a and 63b which lie across from the container connections 11a and 11b. These coupling connections are linked together with a coupling pipe 64. If the filter material of the water container 2 is used up, then the two ball valves 8g and 8h are transferred to the position shown in FIG. 15b. In this position, the secondary borehole 35 of the ball valve 8g communicates with the hard water connection 9a. However, water cannot flow out of this secondary borehole 35 since the valve ball 62 is pressed against its valve seat 62a on the inner circumference of the ball 14 by the water pressure, thus closing the outlet. The hard water flows into an injector 6, which channels regenerating salt from a regenerating means container (not shown) to connection 11a, so that the mixture of hard water and regenerating means is passed into the water container 2. This mixture flows out of the lower end of the water container and is passed to the container connection 11b of the ball valve 8h. The ball 14 of this ball valve is positioned in a 45° intermediate position where the container connection 11b as well as the coupling connection 12b are released. The mixture can flow into the channel connection 12a by means of the coupling pipe 64, which is not blocked by the ball 14 of the ball valve 8h, and by means of the main borehole 34 of the ball valve 8g.

Figure 15C:
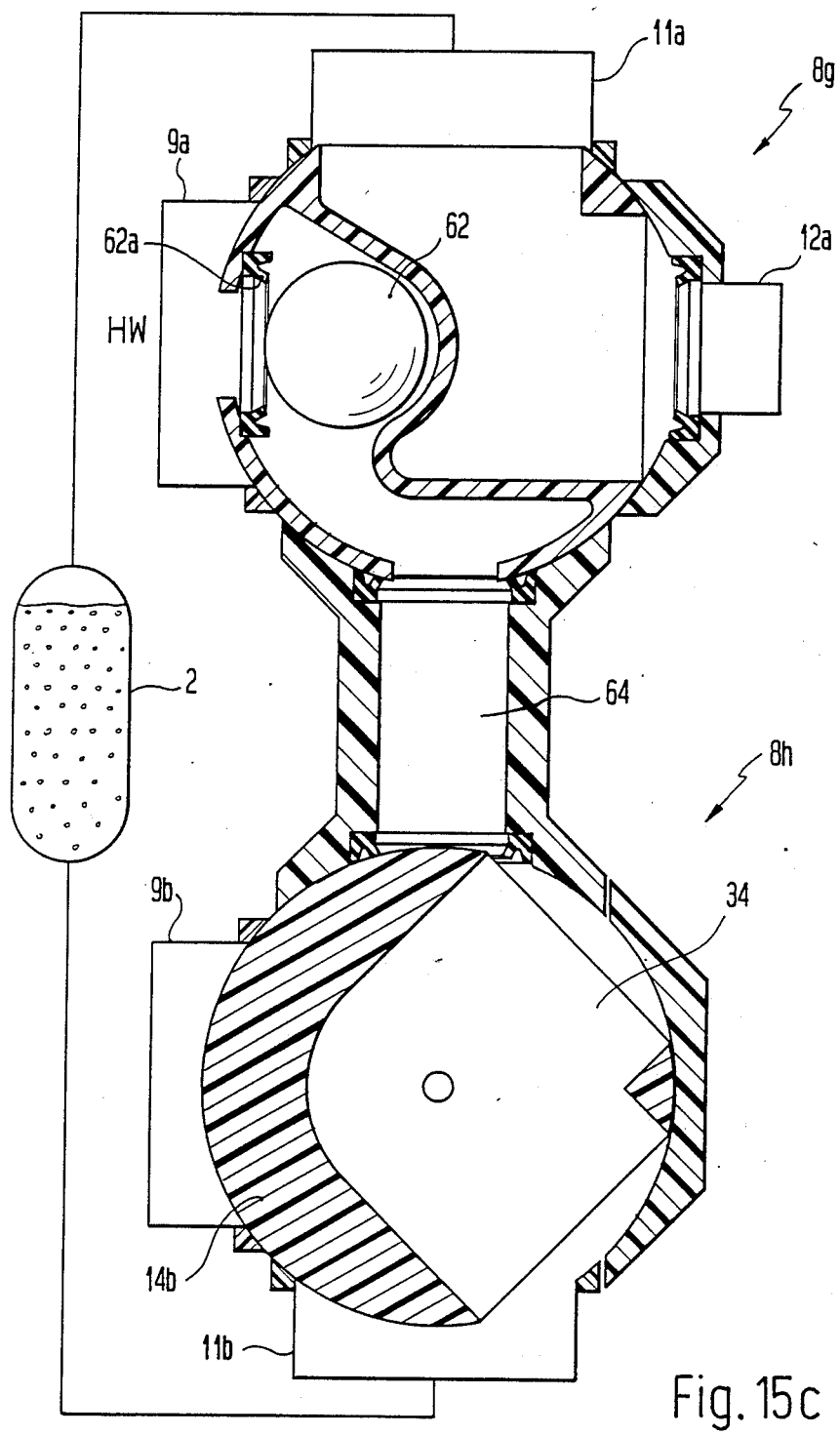

A valve position according to FIG. 15c is called for when the water container 2 is rinsed after the regenerating step. The ball of ball valve 8h remains in position, while the ball of ball valve 8g is rotated 90° to the left. The water flowing into the hard water connection 9a presses the valve ball 62 out of its valve seat 62a so that hard water flows through the secondary borehole 35, the coupling pipe 64 and firmly through the main borehole 34 of the ball of the second ball valve and, by means of container connection 11b, to the lower end of water container 2. The soft water connection 9b of ball valve 8h is closed, comparable to FIG. 15b showing the introduction of regenerating means.

Figure 16:
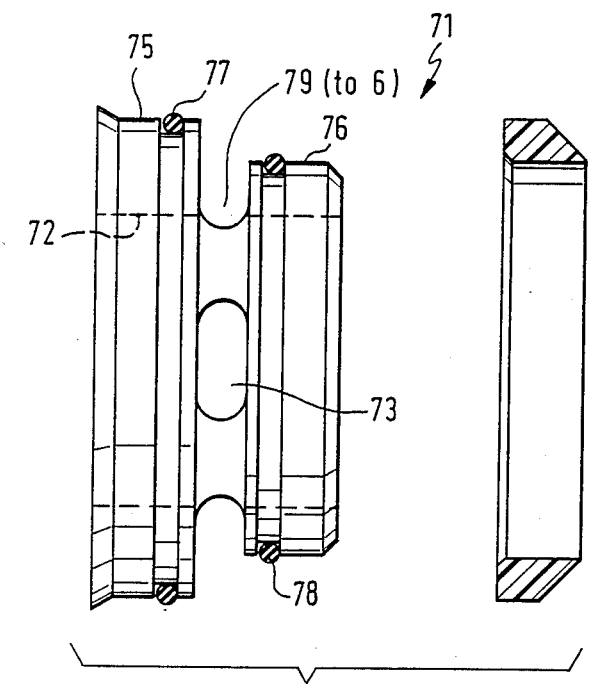
FIG. 16 shows a watertight insert for a connection of the central control valve with a circulating flow channel for coupling with an injector.

In FIG. 16 a sealed insert 71 is shown, which can be inserted in the connection of ball valves of the sort described which communicate with the injector. In a ball valve according to FIG. 4, these connections are 9b, 10b and 11b. This sealed insert 71 has a transit channel 72, which has openings 73 leading outward located roughly in its mid-section. In front of and behind these openings 73, the sealed insert has two shoulders 75 and 76, which lie on the walls of the respective connections and are sealed off by means of O-rings 77 and 78 across from the inner wall of this connection. Thus a circular channel 79 within the connection is found between these O-rings; this circular channel can be coupled with the injector which is arranged directly on the valve housing.

Figure 17A:
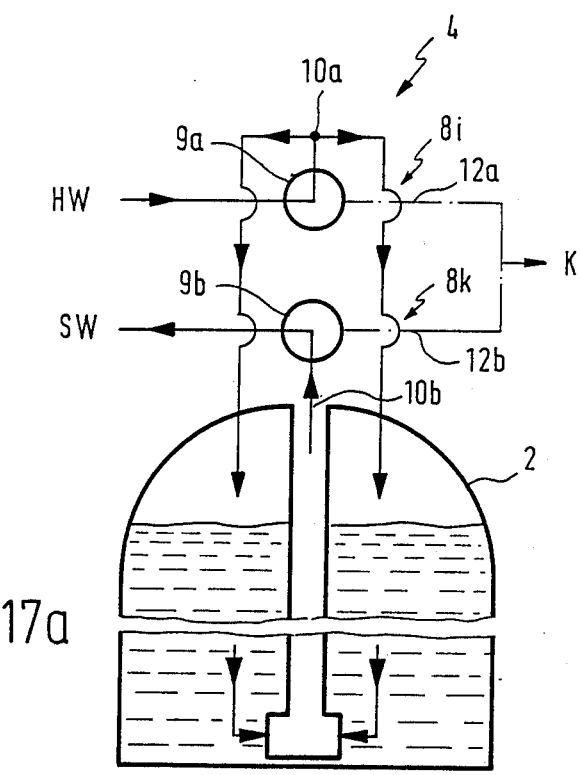
FIG. 17a shows a schematic representation of a water treatment system with a central control valve arrangement according to the invention.
Figure 17C:
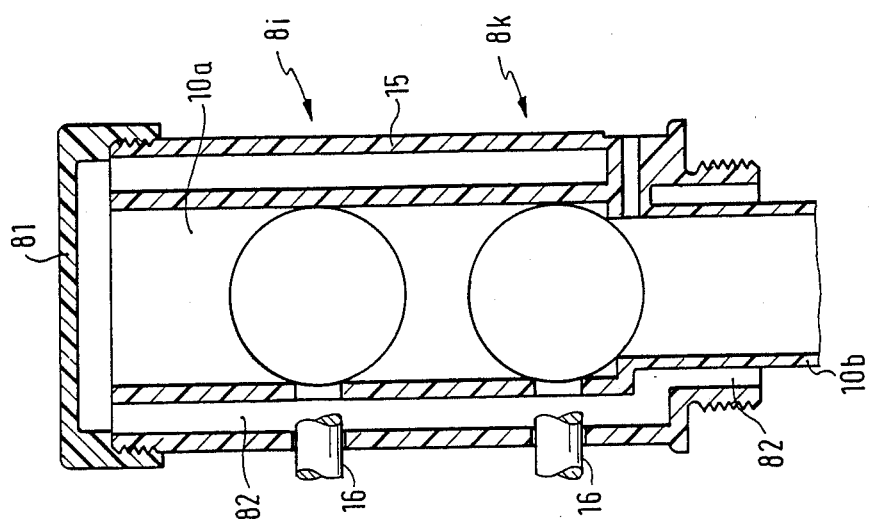
FIGS. 17b and 17c show schematic cross sections through the central control valve arrangement according to FIG. 17a to illustrate the manner of operation.
Figure 17B:
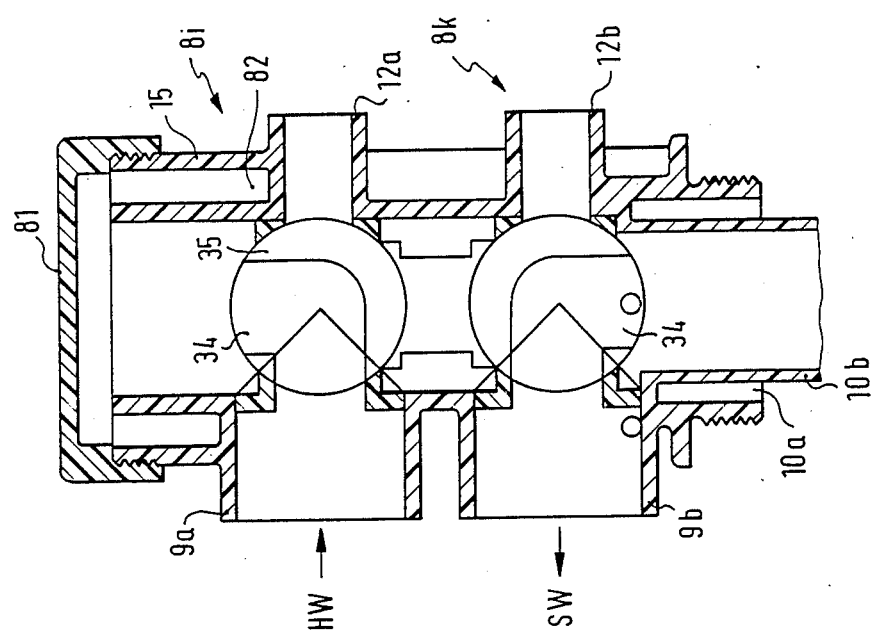

FIG. 17a shows the schematic representation of a water treatment system 1 with a water container 2; it also shows a central control valve arrangement 4, mounted directly on the container. This central control valve arrangement has two ball valves 8i and 8k. The balls have main and secondary boreholes as described above. The upper ball valve 8i has a lateral hard water connection 9a, an upper container connection 10a as well as a channel connection 12a, while the lower ball valve 8k likewise has a laterally lying soft water connection 9b, a lower container connection 10b and a channel connection 12b. The channel connections 12a and 12b are coupled with a channel 13. During the operation hard water flows through the connection 9a to the top side of the water container 2 by means of the container connection 10a. At the lower end of the water container, soft water is removed, passing to the soft water connection 9b by means of the container connection 10b. The valve is as shown in FIGS. 17b and 17c: a single structural unit with a valve housing 15, whereby a turnaround lid 81 is coupled with the container connection 10a, so that out of this connection 10a discharged hard water is passed into a circular channel 82 which surrounds the two ball valves 8i and 8k. The lower end of the circular channel empties directly into the top side of the water container. The connections 9a and 12a and 9b and 12b are located directly opposite, whereby vertical to this the positioning shaft 16 for the balls is arranged, as shown in FIG. 17c. Both ball valves, which are additionally coupled together between the connection 9a and 9b by means of a coupling channel 64 lying in the longitudinal axis of the valve similar to the coupling pipe 64 of FIG. 15, each have balls with a main and a secondary borehole corresponding to the central control valve arrangement of FIG. 14. The particular valve positions for the soft water removal, the salting and the rinsing follow automatically.

Figure 18:
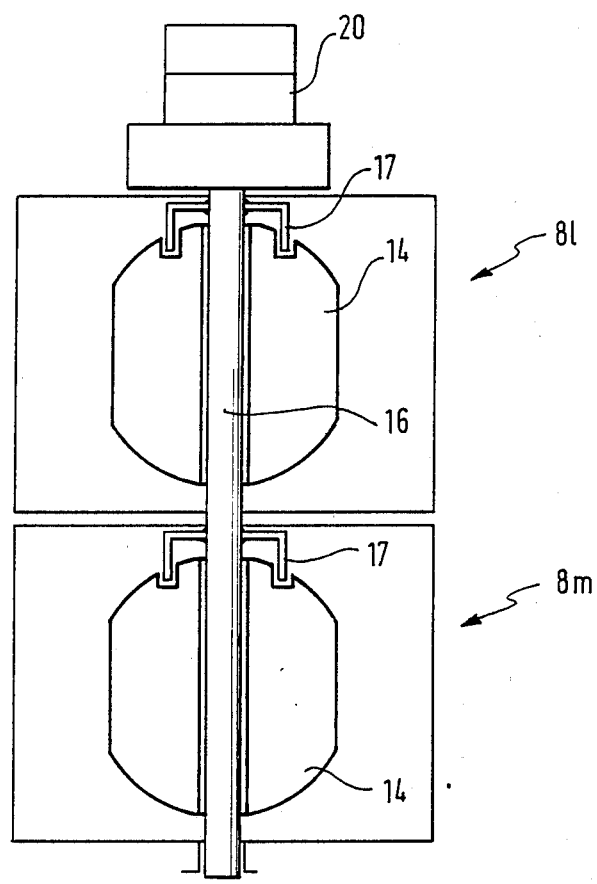
FIG. 18 shows a schematic cross section through a central control valve with ball valves lying one upon the other.

In FIG. 18, the ball valves 8l and 8m are arranged one upon the other, so that they can be driven with a common drive shaft 16 of the servomotor 20. The balls freely turn on the shaft and are taken along by means of a left and right turning clutchwheel 17.

The above embodiments of central control valve arrangements describe just a few examples. The ball valves can be designed geometrically quite differently, whereby the geometrical design of both L-shaped boreholes is contingent on the design of the connections and vice versa. Thus, it is possible for example to lay the bore axes of the two L-shaped boreholes in two vertical planes rather than in one plane, whereby then the arrangement of the valve connections must also be changed accordingly.

The central control valve arrangement has been described in FIGS. 1 to 13 for use as a function control of a water treatment system with two water containers. This design allows the continual removal of soft water. Each pictured central control valve arrangement can also, however, be used as the functional control means of a water treatment system with a single water container, for example the right water container. In this case, the container connections 11a and 11b are coupled directly with one another. Additionally, the ball of the second ball valve is equipped with only one borehole, namely the main borehole. The above mentioned function steps for the removal of soft water, for regeneration and for rinsing follow automatically.

By appropriate arrangement of the connections and thereby also of the course of the L-shaped borehole, the central control valve arrangement can be connected in all positions desirable for a water treatment system.

I claim:
1. A central control valve arrangement for a water treatment system including a water container with a filter for the conversion of hard water into soft water and a regenerating means container for regenerating the filter, the central control valve comprising: two four-way ball valves each having a ball-shaped valve body, each valve body having at least one L-shaped borehole, valve body actuation means operatively connected with each of the valve bodies for independently turning the respective valve bodies from a common drive means, wherein the central control valve can be set in several different positions, for causing in at least one first valve position the removal of soft water from the water container, for causing in a second valve position the introduction of regenerating means into the water container for regeneration of the filter, and for causing in a third valve position the rinsing of the water container after the regeneration of the filter with draining of the rinse water into a drain channel.

2. A central control valve apparatus according to claim 1, wherein the valve bodies of both ball valves are positionable about corresponding parallel turn axes.

3. A central control valve apparatus according to claim 2, wherein the valve bodies are coupled with a shaft that lies on the respective turn axis, each shaft being coupled with a positioning device by means of a clutchwheel which can turn the valve bodies in only one direction.

4. A central control valve apparatus according to claim 3, wherein the shafts of each of the two ball valves are coupled with a respective toothwheel containing the clutchwheel, said toothwheel engaging a common driving toothwheel, which is driven by the positioning device, wherein the positioning device is operable in both directions.

5. A central control valve apparatus according to one of claims 3 or 4, wherein the positioning device includes an electric motor.

6. A central control valve apparatus according to claim 1, wherein two water containers are connected to the central control valve arrangement.

7. A central control valve apparatus according to claim 1, wherein a valve housing provides both a connection opening outside a wall of the housing which is reduced in cross section, centrally aligned, concentric and hydraulic, and a coupling structure for connecting both ball valves.

8. A central control valve apparatus according to claim 7, wherein the valve housing is coupled with an injector having a suction connection coupled with a regenerating means container, and that each of the connections coupled with the injector has a sealed insert, which has both a transit channel and a circular channel situated between two O-rings, whereby said circular channel within the valve housing is coupled with a connection of the injector.

9. A central control valve apparatus according to claim 1, wherein a connection of a ball valve is covered by a turnaround lid coupled with a circular channel, surrounding the two ball valves and leading to a water container.

10. A central control valve apparatus according to claim 1, wherein the ball valves are arranged one upon the other and that the balls are driven by means of a common driving shaft incorporating counter turning clutchwheels.

11. A central control valve arrangement for a water treatment system including a water container with a filter for the conversion of hard water into soft water and a regenerating means container for regenerating the filter, the central control valve comprising: two four-way ball valves each having a ball-shaped valve body, each valve body having at least one L-shaped borehole, valve body actuation means operatively connected with each of the valve bodies for independently turning the respective valve bodies, wherein the central control valve can be set in several different positions, for causing in at least one first valve position the removal of soft water from the water container, for causing in a second valve position the introduction of regenerating means into the water container for regeneration of the filter, and for causing in a third valve position the rinsing of the water container after the regeneration of the filter with draining of the rinse water into a drain channel, wherein each ball valve includes four connections, of which one is a drain channel connection, and that at least the drain channel connection has a reduced cross section in comparison to the other connections.

12. A central control valve arrangement according to claim 11, wherein three of the four connections of each ball valve have substantially the same cross section and the drain channel connection has a smaller cross section, wherein the valve body of at least one ball valve includes two L-shaped boreholes, a main borehole having a cross section corresponding to the cross section of the three connections with a freely flowing intake connection at the ball circumference and a secondary L-shaped borehole having at least one intake opening narrowed by means of a sealing body so that when the intake opening of the secondary borehole lies on the drain channel connection the intake opening is closable by the sealing body and when the intake opening of the secondary borehole lies on one of the other three connections the intake opening is only partly covered by the sealing body and permits communication between the borehole and one of the other three connections.

13. A central control valve arrangement according to claim 12, wherein the sealing body of the secondary borehole includes a sealing plate.

14. A central control valve arrangement according to claim 12, wherein the valve bodies of both ball valves are constructed identically and each has both a main borehole and a secondary borehole.

15. A central control valve arrangement according to claim 14, wherein the axes for both the main and secondary boreholes are coincident about an axis lying normal to a common direction of flow between the boreholes of the valve bodies.

16. A central control valve apparatus according to claim 12, wherein the sealing body is positionable within the secondary borehole of a valve body by positioning means.

17. A central control valve apparatus according to claim 16, wherein the positioning means includes a steering cam lying within a main groove into which actuating elements extend for moving the sealing body.

18. A central control valve apparatus according to claim 17, wherein the steering cam is connected with one of a set of planetary gears which are driven by the valve body.

19. A central control valve apparatus according to claim 12, including a valve ball positioned in the secondary borehole, the valve ball operable to release and to close in the manner of a check valve.

20. A central control valve apparatus according to claim 11, wherein the drain channel connections of both ball valves lead into a common channel.

* * * * *